United States Patent
Hoover et al.

(10) Patent No.: US 9,120,693 B2
(45) Date of Patent: Sep. 1, 2015

(54) MULTI-CORE OPTICAL FIBER RIBBONS AND METHODS FOR MAKING THE SAME

(75) Inventors: Brett Jason Hoover, Middlebury Center, PA (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 370 days.

(21) Appl. No.: 13/273,495

(22) Filed: Oct. 14, 2011

(65) Prior Publication Data

US 2012/0114292 A1   May 10, 2012

Related U.S. Application Data

(60) Provisional application No. 61/411,017, filed on Nov. 8, 2010.

(51) Int. Cl.
  *G02B 6/44* (2006.01)
  *G02B 6/02* (2006.01)
  (Continued)

(52) U.S. Cl.
  CPC ....... *C03B 37/0142* (2013.01); *C03B 37/01211* (2013.01); *C03B 37/01282* (2013.01); *C03B 37/01446* (2013.01); *C03B 37/01493* (2013.01); *C03C 25/1065* (2013.01); *G02B 6/02042* (2013.01); *C03B 2201/31* (2013.01); *C03B 2203/04* (2013.01); *C03B 2203/22* (2013.01);
  (Continued)

(58) Field of Classification Search
  USPC .......................... 385/114, 123, 124, 126–128
  See application file for complete search history.

(56) References Cited

U.S. PATENT DOCUMENTS

| | | | |
|---|---|---|---|
| 4,653,852 | A | 3/1987 | Suzuki et al. |
| 4,828,349 | A | 5/1989 | Nakasuji |

(Continued)

FOREIGN PATENT DOCUMENTS

| | | |
|---|---|---|
| CN | 1503021 A | 6/2004 |
| CN | 1942799 A | 4/2007 |

(Continued)

OTHER PUBLICATIONS

Chinese Office Action, dated Jun. 11, 2015, pp. 1-10, Chinese Application No. 201180064266.7, The State Intellectual Property Office of The People's Republic of China, China.

*Primary Examiner* — Tina M Wong
(74) *Attorney, Agent, or Firm* — John P. Ciccarelli; Robert L. Carlson

(57) ABSTRACT

Multi-core optical fiber ribbons and methods for making multi-core optical fiber ribbons are described herein. In one embodiment, a multi-core optical fiber ribbon includes at least two core members formed from silica-based glass and oriented in parallel with one another in a single plane. Adjacent core members have a center-to-center spacing ≥15 microns and a cross-talk between adjacent core members is ≤−25 dB. In this embodiment each core member is single-moded with an index of refraction $n_c$, and a core diameter $d_c$. In an alternative embodiment, each core member is multi-moded and the center-to-center spacing between adjacent core members is ≥25 microns. A single cladding layer is formed from silica-based glass and surrounds and is in direct contact with the core members. The single cladding layer is substantially rectangular in cross section with a thickness ≤400 microns and an index of refraction $n_{cl} \leq n_c$.

15 Claims, 8 Drawing Sheets

(51) Int. Cl.
  *C03B 37/014* (2006.01)
  *C03B 37/012* (2006.01)
  *C03C 25/10* (2006.01)
  *G02B 6/028* (2006.01)
  *G02B 6/036* (2006.01)

(52) U.S. Cl.
  CPC ......... *C03B 2203/23* (2013.01); *C03B 2203/24* (2013.01); *C03B 2203/34* (2013.01); *G02B 6/0288* (2013.01); *G02B 6/02395* (2013.01); *G02B 6/03627* (2013.01)

(56) References Cited

U.S. PATENT DOCUMENTS

| | | | |
|---|---|---|---|
| 5,570,442 A * | 10/1996 | Arii et al. | 385/46 |
| 6,301,420 B1 | 10/2001 | Greenaway et al. | |
| 6,539,151 B2 | 3/2003 | Fajardo et al. | |
| 6,775,451 B1 | 8/2004 | Botelho et al. | |
| 6,849,333 B2 | 2/2005 | Schissel et al. | |
| 6,859,593 B2 | 2/2005 | Fournier | |
| 6,970,629 B2 * | 11/2005 | Lail et al. | 385/100 |
| 7,277,615 B2 * | 10/2007 | Greenwood et al. | 385/100 |
| 2002/0181512 A1 * | 12/2002 | Wang et al. | 372/6 |
| 2007/0157674 A1 | 7/2007 | Yoon | |
| 2008/0019647 A1 | 1/2008 | Sato | |
| 2010/0290750 A1 * | 11/2010 | Imamura | 385/126 |
| 2011/0129190 A1 * | 6/2011 | Fini et al. | 385/126 |

FOREIGN PATENT DOCUMENTS

| | | |
|---|---|---|
| CN | 1945363 A | 4/2007 |
| CN | 100999381 A | 7/2007 |
| JP | 9071431 A | 3/1997 |
| JP | 2006227203 A | 8/2006 |
| WO | 2010082656 A1 | 7/2010 |

* cited by examiner

MULTI-CORE OPTICAL FIBER RIBBONS AND METHODS FOR MAKING THE SAME

CROSS-REFERENCE TO RELATED APPLICATIONS

This application claims the benefit of priority under 35 U.S.C. §119 of U.S. Provisional Application Ser. No. 61/411,017 filed on Nov. 8, 2010, the content of which is relied upon and incorporated herein by reference in its entirety.

BACKGROUND

1. Field

The present specification generally relates to optical fibers ribbons and, more specifically, to optical fiber ribbons with multiple cores and methods for making the same.

2. Technical Background

In recent years optical fiber has become accepted as a viable alternative to traditional materials used for data signal communication. Optical fiber is now widely utilized in a variety of electronic devices to facilitate the high-speed communication of data signals at high bandwidths. However, as the speed and bandwidth of the electronic components in data communication devices increases, there is a corresponding need to increase the speed of optical interconnects which couple such devices. One solution to increase the speed of optical interconnects is to increase the fiber density of the optical interconnects and thereby realize high fiber count connectors. However, increasing the number of individual fibers in an optical interconnect adds to the overall size of the optical interconnect.

SUMMARY

According to one embodiment, a multi-core optical fiber ribbon includes at least two core members formed from silica-based glass and oriented in parallel with one another in a single plane. Adjacent core members have a center-to-center spacing ≥15 microns and a cross-talk between adjacent core members is ≤−25 dB. Each core member is single-moded with an index of refraction $n_c$, and a core diameter $d_c$. A single cladding layer is formed from silica-based glass and surrounds and is in direct contact with the core members. The single cladding layer is substantially rectangular in cross section with a thickness ≤400 microns and an index of refraction $n_{c1} \leq n_c$.

In another embodiment, a multi-core optical fiber ribbon includes at least two core members formed from silica-based glass and oriented in parallel with one another in a single plane. Adjacent core members have a center-to-center spacing ≥35 microns and a cross-talk between adjacent core members is ≤−25 dB. Each core member is multi-moded with an index of refraction $n_c$, a diameter $d_c$ of greater than 15 microns, has an alpha profile with an α value from about 1.9 to about 2.1, and a bandwidth >300 MHz. A single cladding layer formed from silica-based glass surrounds and is in direct contact with the at least two core members. The single cladding layer is substantially rectangular in cross section with a thickness ≤400 microns and a cladding index of refraction $n_{c1} < n_c$.

In another embodiment, a method for forming a multi-core optical fiber ribbon includes forming a core cane assembly comprising a plurality of core cane members oriented in parallel in a single plane. The core cane assembly is positioned in a flow of carrier gas comprising silica-glass precursor materials. A burner is traversed across a first surface of the core cane assembly to react the silica-glass precursor materials in the flow of carrier gas thereby causing silica-glass soot to be deposited on the first surface of the core cane assembly. The burner is traversed across a second surface of the core cane assembly to react the silica-glass precursor materials in the flow of carrier gas thereby causing silica-glass soot to be deposited on the second surface of the core cane assembly. Thereafter, the silica-glass soot on the core cane assembly is consolidated to form a multi-core ribbon preform comprising a core cane assembly encircled by a single cladding preform layer, wherein the single cladding preform layer is substantially rectangular in cross section. The multi-core ribbon preform is then drawn into a multi-core optical fiber ribbon having a substantially rectangular cross section.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
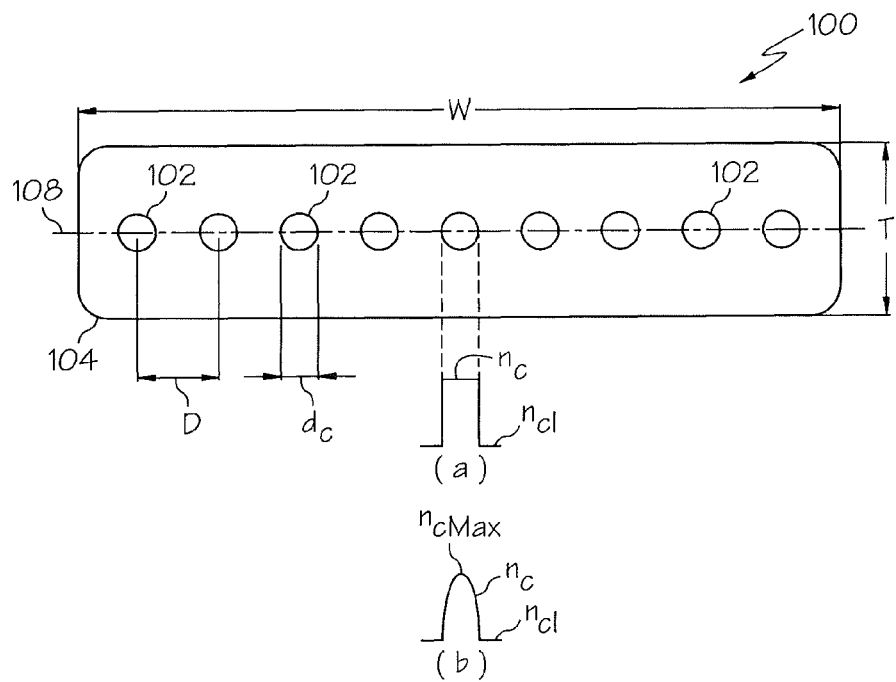
FIG. 1 schematically depicts a cross section of a multi-core optical fiber ribbon according to one or more embodiments shown and described herein.

Reference will now be made in detail to various embodiments of multi-core optical fiber ribbons, examples of which are schematically illustrated in the accompanying drawings. Whenever possible, the same reference numerals will be used throughout the drawings to refer to the same or like parts. One embodiment of an optical fiber ribbon is schematically illustrated in FIG. 1. The multi-core optical fiber ribbon generally comprises at least two core members formed from silica-based glass and surrounded by a single cladding layer which is also formed from silica-based glass. The core members are oriented in parallel with one another in a single plane and spaced such that the cross-talk between adjacent core members is ≤25 dB. The single cladding layer is substantially rectangular in cross section such that the optical fiber ribbon is also substantially rectangular in cross section. Various embodiments of multi-core optical fiber ribbons and methods for making multi-core optical fiber ribbons will be described in more detail herein.

The phrase "refractive index profile," as used herein, refers to the relationship between refractive index or relative refractive index and the dimensions of the optical fiber ribbon.

The phrase "relative refractive index," as used herein, is defined as $\Delta\% = 100 \times (n_i^2 - n_{REF}^2)/2n_i^2$, where $n_i$ is the maximum refractive index in region i, unless otherwise specified. The relative refractive index percent is measured at 1300 nm unless otherwise specified. Unless otherwise specified herein, $n_{REF}$ is the average refractive index of the single cladding layer, which can be calculated, for example, by taking "N" index measurements ($n_{c1}, n_{c2}, \ldots n_{cN}$) of the single cladding layer (which in some preferred embodiments may be undoped silica), and calculating the average refractive index by:

$$n_C = (1/N)\sum_{i=1}^{i=N} n_{Ci}$$

As used herein, the relative refractive index is represented by Δ% and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative refractive index is most negative unless otherwise specified. In cases where the refractive index of a region is greater than the reference index $n_{REF}$, the relative index percent is positive and the region can be said to be raised or to have a positive index.

Bandwidth may be measured at 1300 nm (unless another wavelength is specified) according to FOTP-204 with overfilled launch.

The term "α-profile" or "alpha profile" refers to a relative refractive index profile of the core members, expressed in terms of Δ(r) which is in units of "%", where r is the radius of the core member, which follows the equation:

$$\Delta(r)\% = \Delta(r_o)(1 - [|r - r_o|/(r_1 - r_o)]^\alpha),$$

where $r_o$ is the point at which Δ(r) is maximum, $r_1$ is the point at which Δ(r) % is zero with respect to the single cladding layer, and r is in the range $r_i \leq r \leq r_f$, where Δ is defined above, $r_i$ is the initial point of the α-profile, $r_f$ is the final point of the α-profile, and α is an exponent which is a real number. For a profile segment beginning at the centerline of a core member (r=0), the α-profile has the simpler form $$\Delta(r)\% = \Delta(0)(1 - [|r|/(r_1)]^\alpha),$$

where Δ(0) is the refractive index delta at the centerline of the core member.

Referring now to FIG. 1, a cross section of one embodiment of a multi-core optical fiber ribbon is schematically depicted. In one embodiment, the multi-core optical fiber ribbon 100 generally comprises at least two core members 102 surrounded by a single cladding layer 104. In another embodiment, the multi-core optical fiber ribbon comprises at least three core members 102. The core members 102 are oriented in parallel with one another in a single plane. For example, in the embodiment of the multi-core optical fiber ribbon 100 depicted in FIG. 1, the core members 102 are oriented such that each core member 102 is bisected by plane 108 which extends along a length of the multi-core optical fiber ribbon. In the embodiments described herein, the core members 102 are spaced apart from one another such that the cross-talk between adjacent core members is less than −25 dB, preferably less than −30 dB, even more preferably less than −35 dB and, most preferably, less than −40 dB. Cross-talk levels of less than −25 dB are generally achieved by positioning the core members 102 such that the center-to-center spacing D between adjacent core members is ≥15 microns. In some embodiments, the core members 102 are equidistantly spaced such that the center-to-center spacing between core members is uniform across the width W of the multi-core optical fiber ribbon 100.

Still referring to FIG. 1, the core members 102 are generally formed from silica-based glass and have a core index of refraction $n_c$ and a core relative refractive index $\Delta_c\%$ relative to the single cladding layer 104. In the embodiments described herein, the silica-based glass of the core members 102 is doped with one or more dopants which increases the index of refraction of the core members 102. For example, the core members 102 may comprise silica-based glass doped with germanium such as when the core members 102 comprise silica ($SiO_2$) glass up-doped with germania ($GeO_2$). However, it should be understood that dopants other than germania may be utilized in the core members, including, without limitation, $TiO_2$, $ZrO_2$, $Nb_2O_5$ and/or $Ta_2O_5$. Such dopants may be incorporated in the core members 102 either individually or in combination in order to obtain the desired core index of refraction $n_c$ and relative refractive index $\Delta_c$ %. In the embodiments described herein, the core members 102 contain from about 4.0 wt. % to about 40 wt. % $GeO_2$. For example, in one embodiment, the core members 102 comprise from about 4.0 wt. % to about 6.5 wt. % $GeO_2$, more preferably from about 5.0 wt. % to about 6.0 wt. % $GeO_2$, and, most preferably, from about 5.2 wt. % to about 5.5 wt. % $GeO_2$, which increases the index of refraction $n_c$ of the core members 102 relative to undoped silica glass. In the embodiments described herein, the relative refractive index $\Delta_c$ % of the core members 102 relative to the single cladding layer 104 is ≥0.2%, more preferably ≥0.3% and, most preferably, from about 0.2% to about 2%.

In some embodiments, the core members 102 have a step-index profile as depicted in the refractive index profile (a) of FIG. 1. In other embodiments, the core members 102 have a graded index as depicted in the refractive index profile (b) of FIG. 1. In still other embodiments, the core members 102 may have an α-profile with an α-value which defines the index of refraction of the core members 102 as a function of the radius of the core member 102. In embodiments where the core members 102 have α-profiles, the α-value of the α-profile may be in a range from about 1.9 to about 2.2 as measured at 1300 nm. In embodiments where the core members 102 have a graded index and/or an α-profile, the core members 102 have a relative refractive index percent $\Delta_c$ % relative to the single cladding layer 104 and a maximum relative refractive index percent $\Delta_{cMax}$ % of greater than 0.5% and less than 2.2%, preferably at least 0.6%, more preferably at least 1.0%, even more preferably at least 1.5% and, most preferably, 2.0%.

In some embodiments described herein, the core members 102 are single mode cores and have diameters $d_c$≤15 microns, preferably in the range from about 3 microns to about 10 microns, more preferably from about 6 microns to about 9 microns, and most preferably, from about 7 microns to about 8 microns. In some embodiments, the core members 102 may be single moded at wavelengths from about 1260 nm to about 1700 nm. Alternatively, the core members 102 may be single-moded at wavelengths from about 1500 nm to about 1700 nm. In embodiments where the core members 102 are single mode cores, the center-to-center spacing D between adjacent core members is ≥15 microns.

In embodiments where the core members 102 of the multi-core optical fiber ribbon 100 are single-moded, the ratio R of the core spacing D to the core diameter $d_c$ is ≤6, preferably in a range from about 2 to 6.

In other embodiments, the core members 102 are multi-mode cores and have diameters $d_c$≥15 microns, preferably >15 microns and ≤65 microns, more preferably from about 25 microns to about 50 microns, and even more preferably from about 35 microns to about 50 microns. In some embodiments the multi-mode cores support the propagation of multiple modes at wavelengths from about 830 nm to about 880 nm. Alternatively, the multi-mode cores may support propagation of multiple modes at wavelengths from about 1020 nm to about 1100 nm. In embodiments where the core members 102 are multi-mode cores, the center-to-center spacing D between adjacent core members is ≥35 microns. In these embodiments, the core members 102 have a bandwidth of >300 MHz, preferably ≥500 MHz/km, more preferably ≥750 MHz/km, even more preferably ≥1 GHz/km, and, most preferably, ≥2 GHz/km. The multi-mode cores generally have a graded refractive index profile such as the refractive index profile (b) of FIG. 1. More specifically, the multi-mode cores generally have a graded index α profile with an α value from about 1.9 to about 2.1, as described above.

In embodiments where the core members 102 are multi-moded, the ratio R of the core spacing D to the core diameter $d_c$ is in a range from about 1 to about 3, more preferably less than about 2.0 and, most preferably, less than about 1.5.

In some embodiments described herein the relative refractive index $\Delta_c$ % of adjacent cores members 102 are substantially the same such that adjacent core members 102 are phase matched. However, in other embodiments, the indices of refraction of adjacent core members are different which, in turn, creates a variation in the relative refractive index $\Delta_c$ % of adjacent core members 102. This variation in the relative refractive index $\Delta_c$ % of adjacent core members is referred to herein as a delta variation. For a given center-to-center spacing D, a delta variation between adjacent core members 102 reduces the cross-talk between the adjacent core members 102. Accordingly, adjacent core members 102 with a delta variation may be placed closer together than adjacent core members which do not have a delta variation without increasing the amount of cross-talk between the adjacent core members. In some embodiments described herein, adjacent core members 102 may have a delta variation ≥1% which allows the core members to be positioned closer together without increasing the cross-talk between the core members. In some embodiments, the effective index variation between adjacent core members (i.e., the difference in the index of refraction of adjacent core members) is greater than or equal to about $5\times10^{-5}$.

Figure 2A:
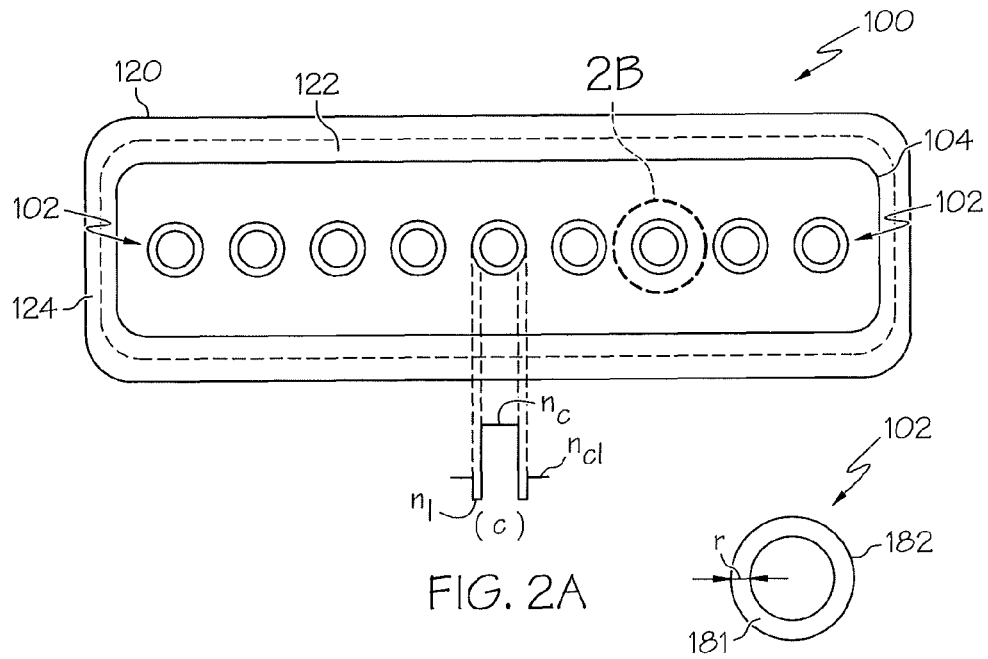
FIG. 2A schematically depicts a cross section of a multi-core optical fiber ribbon according to one or more embodiments shown and described herein.
Figure 2B:
FIG. 2B schematically depicts a cross section of a core member of the multi-core optical fiber ribbon of claim 2A.

Referring now to FIGS. 2A and 2B, another embodiment of a multi-core optical fiber ribbon 100 is schematically depicted. In this embodiment the optical fiber ribbon comprises a plurality of core members 102. Each core member 102 comprises a central core portion 181 surrounded by a low-index ring 182. The low-index ring 182 generally has an index of refraction $n_1$ and a radial thickness r from about 5 microns to about 20 microns. The index of refraction $n_1$ of the low-index ring 182 is such that $n_1 \leq n_{c1} \leq n_c$ which yields a refractive index profile as depicted in (c) of FIG. 2. In some embodiments, the radial thickness of the low-index ring may be less than about 10 microns and, more preferably, less than about 5 microns. The low index ring 182 may comprise silica glass down-doped with fluorine. For example, the low index ring 182 may comprise from about 0.36 wt. % to about 3.6 wt. % fluorine, more preferably from about 0.72 wt. % to about 2.5 wt. % fluorine, and most preferably, from about 1.4 wt. % to about 2.5 wt. % fluorine such that the relative refractive index percent $\Delta_1$% of the low index ring 182 relative to the single cladding layer 104 is less than about −0.1%, more preferably less than about −0.4%, even more preferably from about −0.4% to about −0.7%. For a given center-to-center spacing D between adjacent core members 102, core members 102 having core portions 181 surrounded by low index rings 182 have reduced the cross-talk between adjacent core members. Thus, adjacent core members 102 with low index rings 182 may be placed closer together than adjacent core members which do not have low index rings without increasing the amount of cross-talk between the adjacent core members. Accordingly, in some embodiments described herein, core members with low index rings may be utilized to decrease the spacing between adjacent core members.

Figure 3:
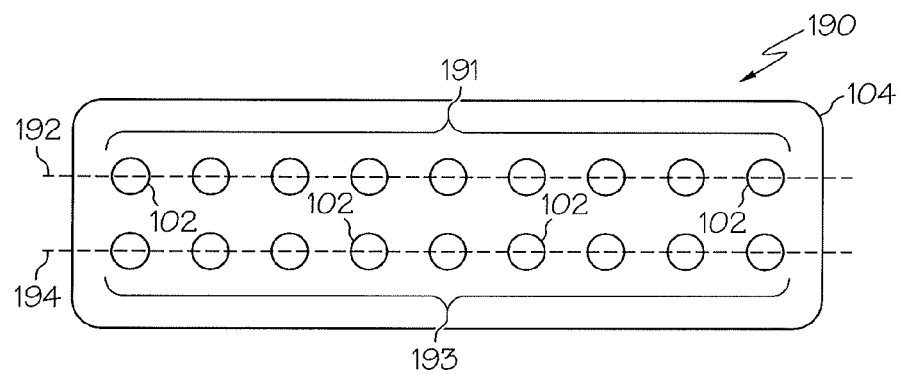
FIG. 3 schematically depicts a cross section of a multi-core optical fiber ribbon according to one or more embodiments shown and described herein.

While FIGS. 1 and 2A depict multi-core optical fiber ribbons with a plurality of core members oriented in parallel in a single plane, it should be understood that, in other embodiments, the multi-core optical fiber ribbon 100 may be formed with a plurality of core members oriented in different planes. Referring to FIG. 3 by way of example, a cross section of one embodiment of a multi-core optical fiber ribbon 190 is schematically depicted. In this embodiment, the multi-core optical fiber ribbon 190 comprises a plurality of core members 102 oriented in parallel with one another. However, in the embodiment of the multi-core optical fiber ribbon 190 shown in FIG. 3, the core members 102 are oriented in a plurality of parallel planes. For example, a first group 191 of core members 102 are oriented such that the core members 102 are bisected by a first plane 192. A second group 193 of core members 102 is oriented such that the second group 193 of core members 102 is bisected by a second plane 194 which is parallel with the first plane 192. Accordingly, it should be understood that the first group 191 of core members 102 is generally parallel to and non-coplanar with the second group 193 of core members 102. Further, while FIG. 3 depicts a multi-core optical fiber ribbon 100 with two planes of core members 102, it should be understood that the multi-core optical fiber ribbons described herein may comprise a single plane of core members or three or more planes of core members.

Referring again to FIG. 1, the core members 102 are surrounded by a single cladding layer 104. In the embodiments described herein, the single cladding layer 104 is formed from silica-based glass ($SiO_2$) with an index of refraction $n_{c1}$ which is less than the core index of refraction $n_c$ (i.e., $n_{c1} < n_c$). In some embodiments the single cladding layer is formed from pure silica-based glass without any dopants which change the index of refraction of silica, such as up-dopants (i.e., germanium and the like) or down-dopants (i.e., boron, fluorine and the like). In other embodiments, the single cladding layer may comprise one or more up-dopants which increase the refractive index of the silica glass, or one or more down-dopants which decreases the refractive index of the silica glass, so long as the cladding index of refraction $n_{c1}$ is less than the core index of refraction $n_c$ and the relative refractive index $\Delta_c$ % of the core members 102 relative to the single cladding layer 104 is greater than about 0.2%, more preferably ≥0.3% and, most preferably, from about 0.2% to about 2%, as described above.

The single cladding layer 104 is generally rectangular in cross section with a width W and a thickness T. In some embodiments, the width W may be equal to the thickness T such as when the single cladding layer 104 is square in cross section. The width W of the core portion is dependent on the number of core members 102 included in the multi-core optical fiber ribbon 100. However, the thickness T of the multi-core optical fiber ribbon 100 is such that the multi-core optical fiber ribbon 100 is flexible in the width W direction and may be coiled in the width direction to a radius of ≤140 mm, more preferably ≤75 mm and, most preferably, ≤5 mm without damaging the glass of the multi-core optical fiber ribbon. In the embodiments described herein, the thickness T of the multi-core optical fiber ribbon 100 is ≤400 microns, more preferably ≤200 microns, even more preferably ≤125 microns and, most preferably, from about 50 microns to about 125 microns.

Referring again to FIG. 2, in some embodiments the multi-core optical fiber ribbon 100 may further comprise at least one optical coating layer 120 which surrounds and directly contacts the single cladding layer 104. The optical coating layer 120 generally has a thickness $T_{oc}$ from about 50 microns to about 150 microns. The optical coating layer has a refractive index $n_{cr} \geq$ the refractive index $n_{c1}$ of the single cladding layer 104. In the embodiment shown in FIG. 2, the optical coating layer 120 comprises a primary coating layer 122 and a secondary coating layer 124. The primary coating layer 122 surrounds and directly contacts the single cladding layer 104 and is formed of relatively soft polymer materials. The primary coating layer 122 has a thickness from about 25 microns to about 125 microns. The secondary coating layer 124 is formed around and directly contacts the primary coating layer 122 and has a thickness from about 50 microns to about 125 microns. The secondary coating layer 124 is generally formed from polymer materials which are relatively harder than the polymer materials from which the primary coating layer 122 is formed. More specifically, the primary coating layer 122 preferably exhibits a Young's modulus less than 100 MPa, more preferably less than 50 MPa, and most preferably less than 10 MPa while the secondary coating layer 124 preferably exhibits a Young's modulus greater than 500 MPa, more preferably greater than 700 MPa, and most preferably greater than 900 MPa. The materials used in the primary and secondary coating layers are UV curable urethane acrylate coating materials. For example, the primary and secondary coatings may comprise materials similar to those disclosed in U.S. Pat. Nos. 6,849,333 and 6,775,451.

While the embodiment of the multi-core optical fiber ribbon 100 of FIG. 2 is depicted with an optical coating layer 120 which comprises a primary coating layer 122 and a secondary coating layer 124, it should be understood that, in other embodiments, the optical coating layer 120 only comprises primary coating layer 122. Further, it should be understood that the optical coating layer 120 is optional and that, in some embodiments, the multi-core optical fiber ribbon 100 may be formed without an optical coating layer 120 as shown in FIG. 1.

In the embodiments of the multi-core optical fiber ribbons described herein, the optical fiber ribbons may be formed in any length. However, it should be understood that the crosstalk between adjacent core members in the multi-core optical fiber ribbon decreases as the length of the optical fiber ribbon decreases. Accordingly, in some embodiments, the length of the multi-core optical fiber ribbon may be less than 500 m, less than 250 m or even less than 100 m.

Methods for producing multi-core ribbon preforms from which multi-core optical fiber ribbon may be drawn will now be described with specific reference to FIGS. 4-11.

Figure 4:
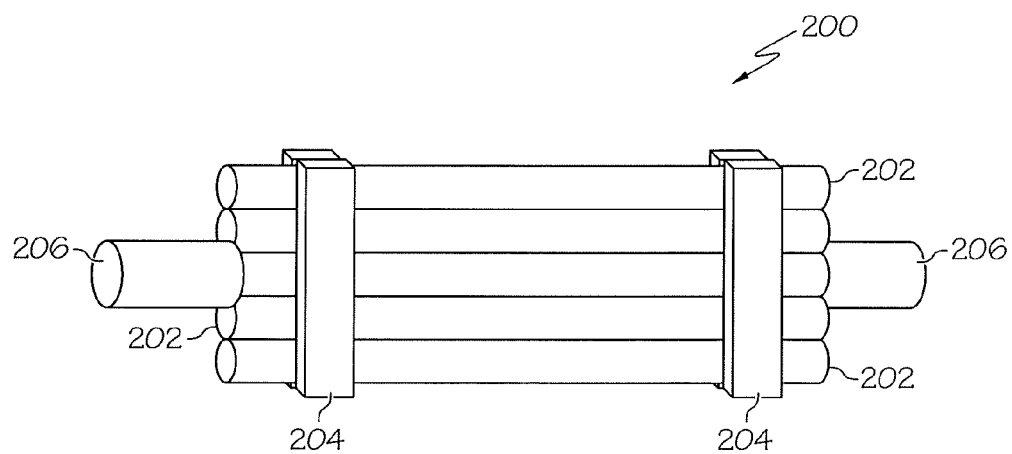
FIG. 4 schematically depicts a core cane assembly for a multi-core ribbon preform according to one or more embodiments shown and described herein.
Figure 5:
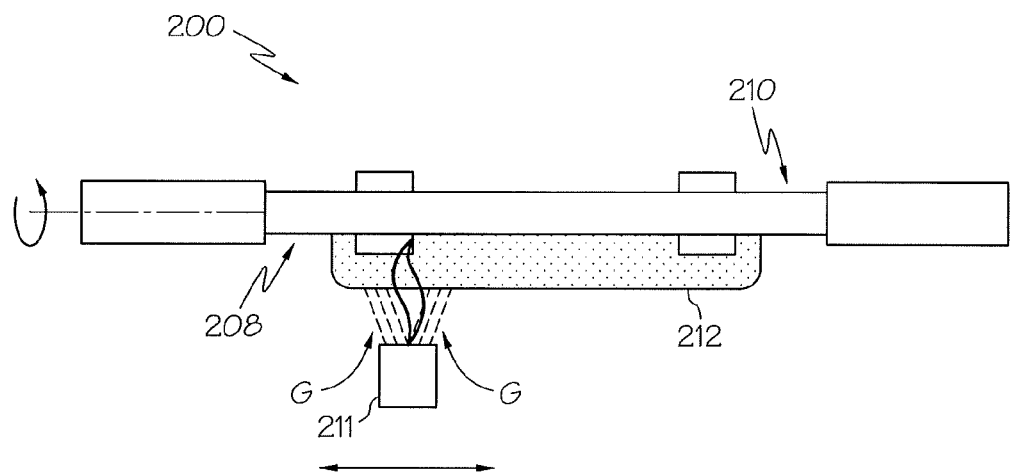
FIGS. 5-6 schematically depicts a method for forming a single cladding preform layer on a core cane assembly according to one or more embodiments shown and described herein.
Figure 6:
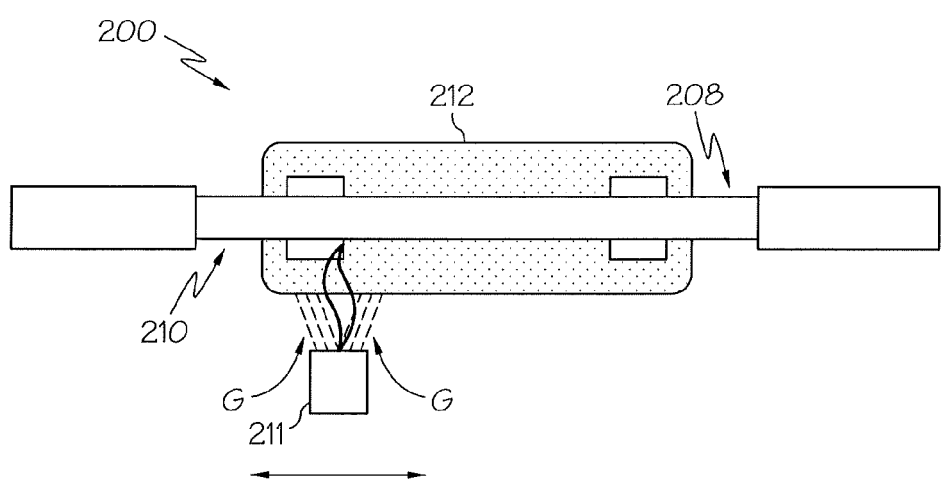

Referring now to FIGS. 4-6, one embodiment of a method for forming a multi-core ribbon preform by outside vapor deposition (OVD) is schematically depicted. In this embodiment, a core cane assembly 200 is first constructed. The core cane assembly 200 generally comprises a plurality of glass core canes 202 that are oriented in parallel with one another in a single plane such that the core canes 202 can be drawn into the core members of the optical fiber ribbon described above. In the embodiment of the core cane assembly 200 shown in FIG. 4, the core canes 202 are tacked together with glass attachment elements 204. The glass attachment elements 204 are generally formed from silica-based glass having the same composition as the single cladding layer of the multi-core optical fiber ribbon as these elements will ultimately become a part of the single cladding layer. The glass attachment elements secure the core canes 202 to one another, maintain the desired spacing between adjacent core canes, and keep the core canes substantially co-planar with one another. The construction of the core cane assembly is completed by fusing glass rods 206 to both ends of the core cane assembly to support the core cane assembly on the spindles of an OVD lathe.

In an alternative embodiment (not shown) the individual core canes 202 of the core cane assembly 200 may be joined together without the use of the glass attachment elements 204.

For example, in one embodiment, the core canes 202 are formed with a thin cladding layer which surrounds the core preform portion of the core cane such that the core cane has a core:clad ratio from about 0.1 to about 0.5. The thin cladding layer surrounding the core canes may be utilized to maintain the desired spacing between adjacent core canes as well as to attach adjacent core canes together. For example, in one embodiment, the adjacent core canes are sintered together at the thin cladding layer to create the core cane assembly.

Referring now to FIG. 5, once the core cane assembly 200 is constructed, the core cane assembly 200 is positioned in an OVD lathe (not shown) such that the silica-based glass forming the single cladding preform layer may be deposited on the core cane assembly 200. In order to achieve the substantially rectangular cross section of the preform layer, a burner 211 is traversed over a first surface 208 of the core cane assembly as a flow of carrier gas G in which silica-glass precursor materials are entrained is directed onto the core cane assembly. In the embodiments described herein, the carrier gas comprises a flow of $O_2$ and $CH_4$ in which vapor-phase silica glass precursor materials are mixed and pyrolyzed by the flame of the burner 211 to create silica-glass soot 212 which is deposited on the first surface 208 of the core cane assembly 200. Where the single cladding layer of the resultant multi-core optical fiber ribbon does not contain a dopant, the vapor-phase silica glass precursor material may be $SiCl_4$ and the pyrolysis process yields silica-glass soot which is deposited on the first surface 208 of the core cane assembly. However, if the single cladding layer contains dopants, such as one or more vapor-phase dopants (e.g., an up-dopant such as $GeO_2$ or a similar down dopant such a $B_2O_3$), the vapor phase dopants may be combined with the $SiCl_4$ such that the pyrolysis process yields doped silica-glass soot which is, in turn, deposited on the first surface 208 of the core cane assembly 200. In the embodiments described herein the temperature of the pyrolysis operation is approximately 1500° C.

In one embodiment, the burner 211 is traversed over the first surface 208 of the core cane assembly 200 until the desired amount of silica-glass soot 212 is deposited on the first surface 208. Thereafter, the core cane assembly 200 is rotated and the pyrolysis process is repeated on the second surface 210 of the core cane assembly 200 until the desired amount of silica-glass soot is deposited on the second surface 210 of the core cane assembly 200, as depicted in FIG. 6. Building up the soot on each of the first surface 208 and the second surface 210 separately permits the deposited silica-glass soot 212 to have a substantially rectangular cross section, which, in turn, may be subsequently imparted to the multi-core optical fiber ribbon. In an alternative embodiment, the core cane assembly 200 may be continuously rotated as the burner is repeatedly traversed along the axial length of the core cane assembly 200 such that the silica-glass soot 212 is deposited on both the first surface 208 and the second surface 210 as the core cane assembly 200 is rotated.

Reference has been made herein to depositing the soot on the first surface 208 and the second surface 210 of the core cane assembly 200. However, it should be understood that, as silica-glass soot is deposited on the first surface 208 and the second surface 210, silica-glass soot is also deposited on the edges of the core cane assembly 200 such that, after the silica glass soot is deposited, the core cane assembly 200 is encircled by a layer of silica-glass soot.

After the silica-glass soot has been deposited on the first surface 208 and the second surface 210 of the core cane assembly 200, the silica-glass soot 212 is consolidated on the core cane assembly to densify the glass soot and form a single cladding preform layer having a substantially rectangular cross section around the core cane assembly. The silica-glass soot is consolidated by drying the silica-glass soot 212 on the core cane assembly 200 in flowing chlorine gas at a temperature from about 1000° C. to about 1100° C. and then heating the silica glass soot 212 on the core cane assembly 200 to a temperature range from about 1450° C. to about 1550° C. in a consolidation oven to produce a single cladding preform layer of fully dense silica-based glass having the desired composition around the core cane assembly 200.

Figure 7:
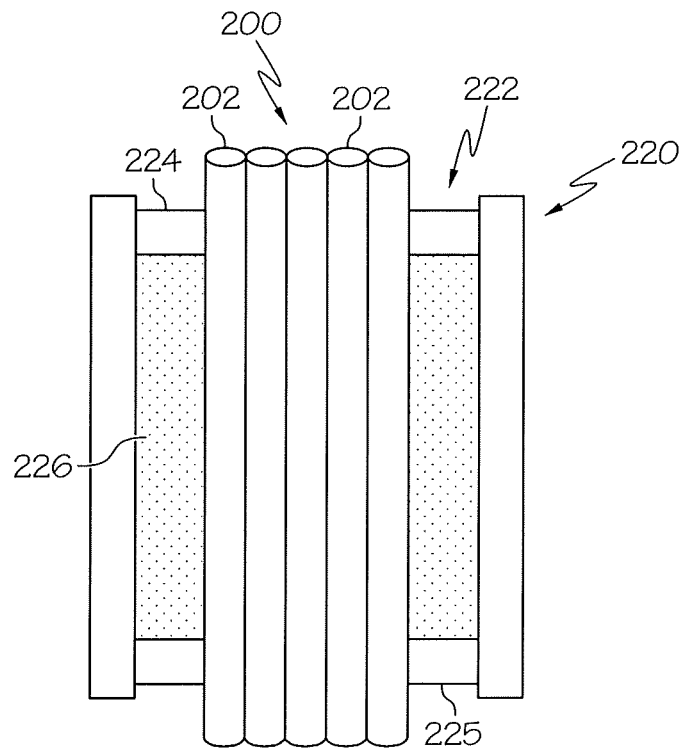
FIG. 7 schematically depicts a cross section of a rectangular mold with a core cane assembly for a multi-core optical fiber ribbon positioned in a rectangular mold cavity and surrounded by glass soot.

Referring now to FIG. 7, in another embodiment, a multi-core optical fiber preform is formed by compressing silica glass soot around a core cane assembly 200. In this embodiment a core cane assembly is positioned in a rectangular mold cavity 222 of a mold body 220. In one embodiment, the core canes 202 of the core cane assembly are individually positioned in the rectangular mold cavity 222. Each individual core cane 202 may extend through an upper ram 224 and a lower ram 225 positioned in the rectangular mold cavity 222, which, in turn, maintains the spacing between the core canes and the orientation of the core canes relative to the mold body 220. In another embodiment, the core canes 202 of the core cane assembly 200 are attached together, as described hereinabove, before the core cane assembly is inserted into the mold cavity. In general, the core canes 202 of the core cane assembly are oriented in parallel with one another in a single plane, as described hereinabove. With the core cane assembly 200 positioned in the mold body 220, silica-glass soot 226 having the desired composition is loaded into the rectangular mold cavity 222 around the core cane assembly 200.

Figure 8:
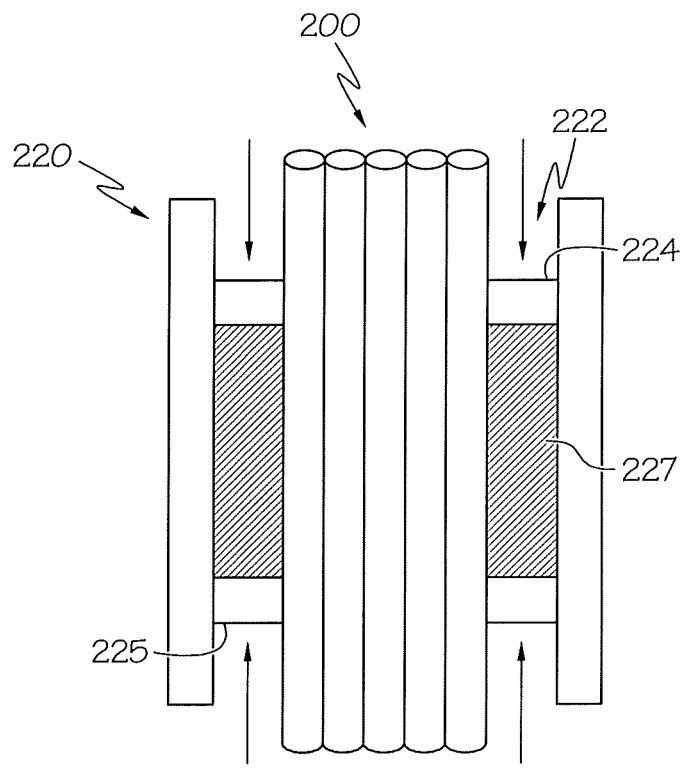
FIG. 8 schematically depicts a cross section of a rectangular mold as glass soot is compressed around a core cane assembly.

Referring now to FIG. 8, the silica-glass soot is compressed to form a soot compact 227 around the core cane assembly 200. In the embodiment shown in FIG. 8, the silica-glass soot is compressed into a soot compact 227 by advancing the rams 224, 225 towards one another along the axial length of the core cane assembly 200. The rams 224, 225 may be advanced using a hydraulic press, a mechanical press or any other press suitable for exerting a force F on the rams 224, 225. Further, it should be understood that the silica glass soot may be compressed by advancing one of the rams (either the upper ram 224 or the lower ram 225) towards the other ram which is held stationary relative to the mold body 220. The silica-glass soot is compressed until the soot reaches a density from about 0.5 g/cc to about 1.2 g/cc, more preferably greater than about 0.7 g/cc and less than about 1.1 g/cc, and most preferably greater than about 0.8 g/cc and less than about 1.0 g/cc. As the silica-glass soot is compressed, the soot compact 227 takes on the rectangular shape of the rectangular mold cavity.

While the embodiment shown in FIG. 8 depicts compressing the silica-glass soot in an axial direction of the core cane assembly 200, it should be understood that, in alternative embodiments, the silica-glass soot may be compressed in a radial direction to form the soot compact 227 around the core cane assembly 200.

After the silica-glass soot is compressed into the soot compact 227, the combination of the soot compact 227 and core cane assembly 200 is removed from the mold body 220 and the soot compact 227 is consolidated on the core cane assembly 200 using the techniques described above to bond the soot compact 227 to the core cane assembly as well as to densify the silica-glass soot thereby forming a multi-core ribbon preform.

Figure 9:
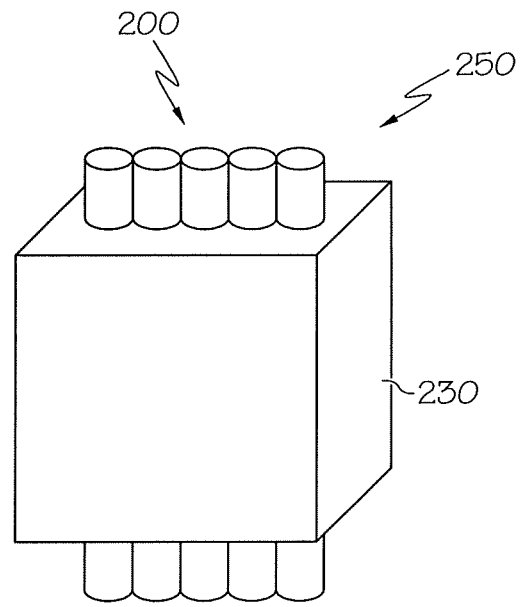
FIG. 9 schematically depicts a multi-core ribbon preform comprising a core cane assembly surrounded by a single cladding preform layer according to one or more embodiments shown and described herein.

Referring now to FIG. 9, a multi-core ribbon preform 250 from which a multi-core optical fiber ribbon may be drawn is schematically depicted. The multi-core ribbon preform 250 generally comprises a core cane assembly 200 which is encircled by a single cladding preform layer 230 formed by the consolidation of silica-glass soot on the core cane assembly 200. In the embodiments described herein, the single cladding preform layer 230 is generally rectangular in cross section such that optical fiber ribbon drawn from the multi-core ribbon preform 250 is also substantially rectangular in cross section. Moreover, while the multi-core ribbon preform 250 is shown with a core cane assembly comprising a plurality of core canes oriented in parallel in a single plane, it should be understood that, in alternative embodiments (not shown), the core cane assembly may be formed with multiple (i.e., 2 or more) planes of core cane members, each of which is parallel and non-coplanar with the other planes of core cane members.

Figure 10:
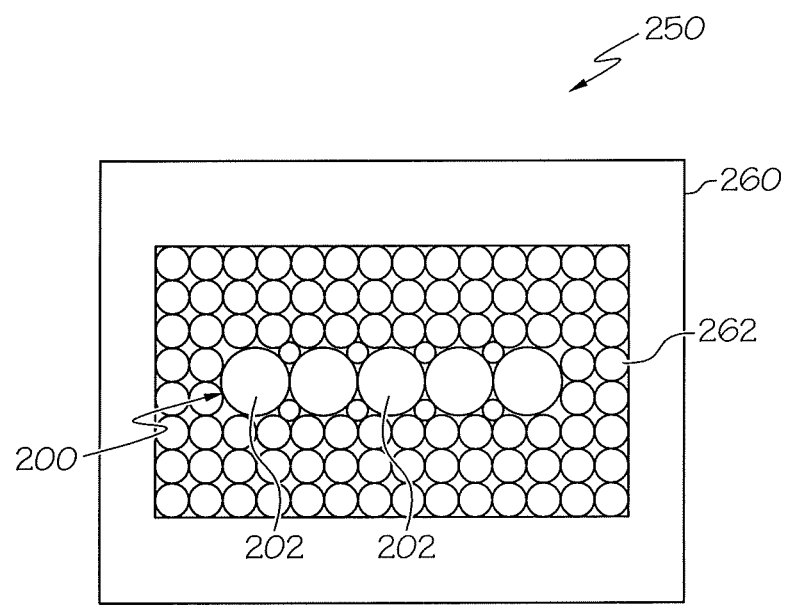
FIG. 10 schematically depicts one embodiment of a multi-core ribbon preform comprising a core cane assembly positioned within a rectangular glass cladding tube.

Referring now to FIG. 10, in an alternative embodiment, a multi-core ribbon preform 250 may be formed using a stack and draw technique. In this embodiment a core cane assembly 200 is positioned in a rectangular glass cladding tube 260 such that the core canes 202 of the core cane assembly are oriented in parallel with one another in a single plane, as described hereinabove. The rectangular glass cladding tube 260 is formed from silica-based glass having the same composition as is desired for the single cladding layer of the multi-core optical fiber ribbon. In general, the silica-based glass of the rectangular glass cladding tube 260 has an index of refraction $n_{c1}$ which is less than the index of refraction $n_c$ of the core canes 202. In the embodiments described herein, the rectangular glass cladding tube 260 has a wall thickness in a range from about 50 mm to about 125 mm, more preferably less than 125 mm, even more preferably less than 100 mm, and, most preferably, less than 90 mm. In one embodiment, the core canes 202 of the core cane assembly 200 are individually positioned in the rectangular glass cladding tube 260. In another embodiment, the core canes 202 of the core cane assembly 200 are attached together, as described hereinabove, before the core cane assembly 200 is inserted into the rectangular glass cladding tube 260. A plurality of filler canes 262 are positioned between the rectangular glass cladding tube 260 and the core cane assembly 200. In the embodiments described herein, the filler canes 262 have the same composition and index of refraction as the rectangular glass cladding tube 260 (i.e., the filler cane index of refraction $n_{filler}$=the rectangular glass cladding tube index of refraction $n_{c1}$). In this embodiment of the multi-core ribbon preform 250, the multi-core ribbon preform is placed under vacuum as the multi-core optical fiber ribbon is drawn from the preform in order to collapse and seal the interstitial spaces between adjacent filler canes 262 and core canes 202.

Figure 11:
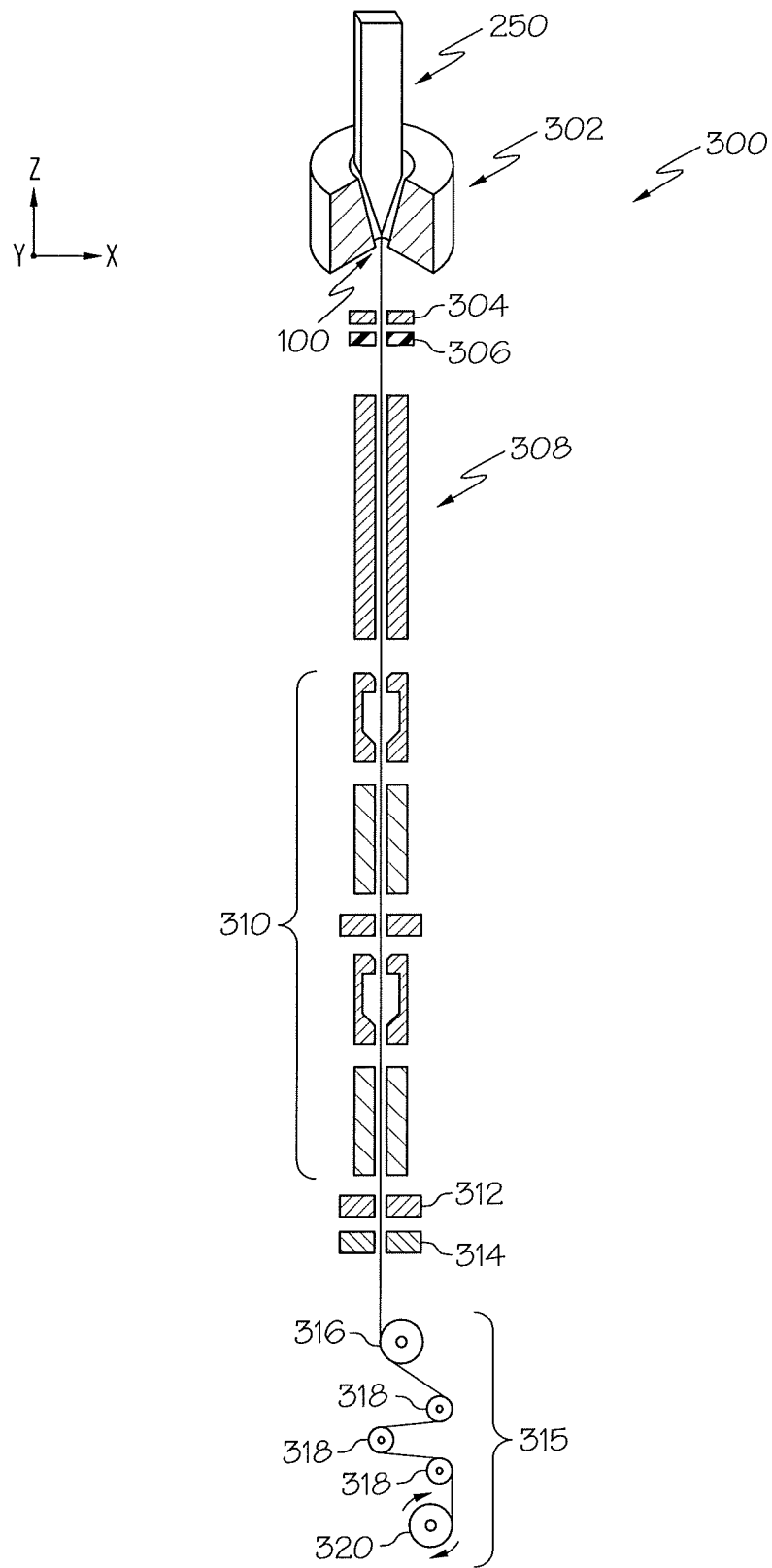
FIG. 11 schematically depicts a multi-core optical fiber ribbon being drawn from a multi-core optical fiber preform, according to one or more embodiments shown and described herein.

Referring to FIG. 11, one embodiment of a system 300 for producing a multi-core optical fiber ribbon from a multi-core ribbon preform is schematically illustrated. The system 300 generally comprises a draw furnace 302 for heating a multi-core ribbon preform 250 such that a multi-core optical fiber ribbon 100 may be drawn from the multi-core ribbon preform 250. The draw furnace 302 is generally vertically oriented such that multi-core optical fiber ribbon 100 drawn from the preform 250 exits the furnace along a substantially vertical pathway (i.e., a pathway that is substantially parallel with the z-direction of the coordinate axes depicted in FIG. 11).

After the multi-core optical fiber ribbon exits the draw furnace 302, the dimensions of the multi-core optical fiber ribbon 100 and the draw tension applied to the multi-core optical fiber ribbon 100 are measured with non-contact sensors 304, 306. As shown in FIG. 11, after the diameter and tension of the multi-core optical fiber ribbon 100 is measured, the multi-core optical fiber ribbon 100 passes through a cooling system 308 which cools the multi-core optical fiber ribbon to less than about 80° C. and, more preferably, less than about 60° C.

After the multi-core optical fiber ribbon exits the cooling system 308, the multi-core optical fiber ribbon enters a coating system 310 in which an optical coating layer is applied to the multi-core optical fiber ribbon. As the multi-core optical fiber ribbon 100 exits the coating system 310, the dimensions of the multi-core optical fiber ribbon is measured again using a non-contact sensor 312. Thereafter, a non-contact flaw detector 314 is used to examine the multi-core optical fiber ribbon for damage and/or flaws that may have occurred during manufacture. A fiber take-up mechanism 315 utilizes various drawing mechanisms 316 and pulleys 318 to provide the necessary tension to the multi-core optical fiber ribbon 100 as the multi-core optical fiber ribbon is drawn through the system 300 and wound onto a storage spool 320.

EXAMPLES

Embodiments of the multi-core optical fiber ribbons will be further clarified by the following prophetic modeled examples. In each modeled example the multi-core optical fiber ribbon consisted of a pair of core members positioned in a single cladding layer. The cross-talk for each modeled multi-core optical fiber ribbon was determined utilizing the following equations. The powers transmitted in two adjacent core members may be calculated as:

$$P_1 = \cos^2(gz) + \left(\frac{\Delta\beta}{2g}\right)^2 \sin^2(gz), \text{ and}$$

$$P_2 = \left(\frac{\kappa}{g}\right)^2 \sin^2(gz),$$

where z is the length of the fiber, κ is the coupling coefficient, Δβ is the mismatch propagation constant between the modes propagating in the adjacent core members when they are insulated from one another, and g is a parameter depending on κ and Δβ such that $$g^2 = \kappa^2 + \left(\frac{\Delta\beta}{2}\right)^2.$$

The cross-talk can be calculated based on the power transmitted through the adjacent core members utilizing the following relationship:

$$X = 10\log\left(\frac{P_2}{P_1}\right) = 10\log\left(\frac{4\kappa^2}{4g^2 c\tan(gz) + (\Delta\beta)^2}\right).$$

Example 1

Figure 12:
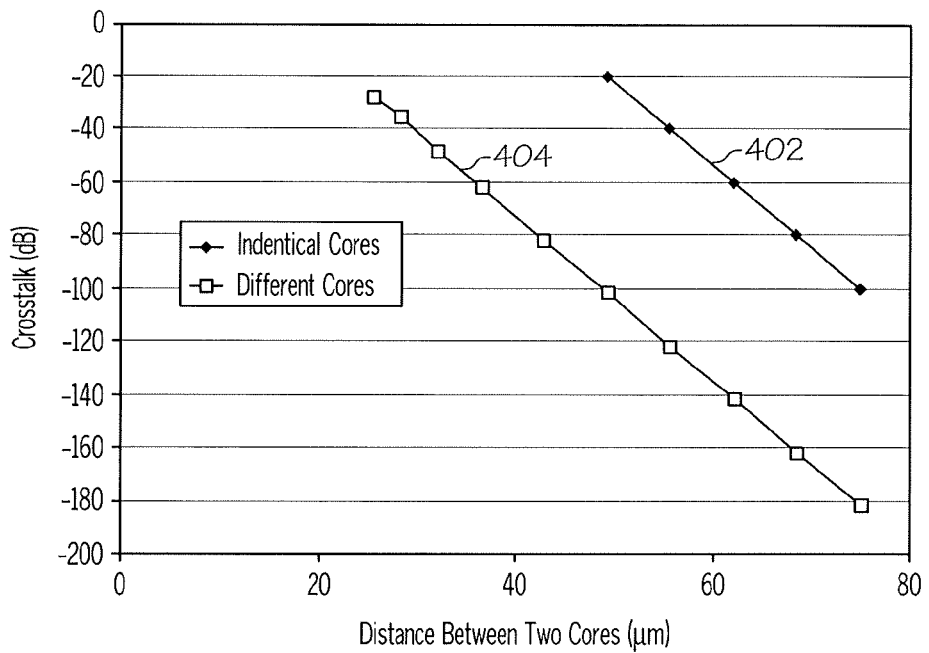
FIG. 12 graphically depicts a plot of the cross-talk between two adjacent core members as a function of the center-to-center spacing between the two adjacent core members for i) a pair of identical core members and ii) a pair of core members with a delta variation of 1%.

Referring to FIG. 12, a pair of multi-core optical fiber ribbons were mathematically modeled. Each core member of the first optical fiber ribbon was modeled with a step refractive index profile and a core relative refractive index $\Delta_c$% of about 0.34%. Each core member had a diameter $d_c$ of 8.4 microns and was single-moded at a wavelength of 1550 nm. The core members were phase matched such that the delta variation between the adjacent core members was zero. Curve 402 in FIG. 12 indicates the cross-talk of the first, phase matched optical fiber ribbon as a function of the distance between the adjacent core members for a fiber length of 100 m at a wavelength of 1550 nm. As shown in FIG. 12, a cross-talk of less than −35 dB is only achieved when the spacing between the two core members is less than 54 microns.

Still referring to FIG. 12, the second multi-core optical fiber ribbon was modeled with a step index refractive index with each core member having a diameter $d_c$ of 8.4 microns such that the core members were single-moded at a wavelength of 1550 nm. However, in this embodiment, the core members had a delta variation of approximately 1% and the corresponding effective index change of the fundamental mode propagated in each fiber is about $5 \times 10^{-5}$. As shown in FIG. 12, a cross-talk of less than −35 db is achievable when the spacing between the two core members is 28 microns. The effective index variation can also be achieved by varying the core radius. In the following hypothetical examples the cross-talk was calculated assuming the adjacent core members had an effective index variation of approximately $5 \times 10^{-5}$.

Example 2

Figure 13:
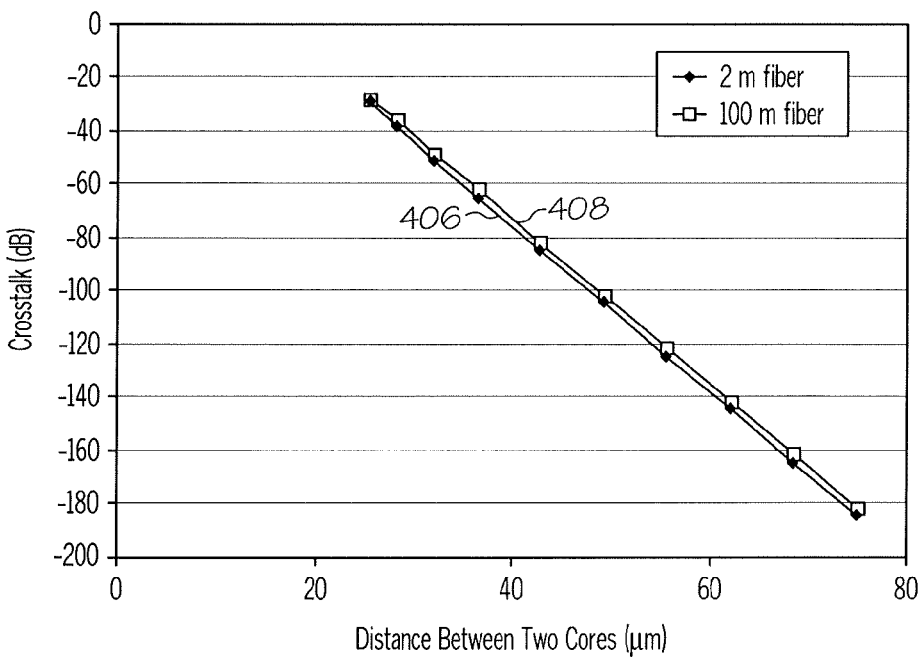
FIG. 13 graphically depicts a plot of the cross-talk between two adjacent core members as a function of the center-to-center spacing between the two adjacent core members for i) a fiber length of 100 meters and ii) a fiber length of 2 meters.

Referring now to FIG. 13, a pair of multi-core optical fiber ribbons were mathematically modeled. Each core member of both optical fiber ribbons was modeled with a step refractive index profile and a core relative refractive index $\Delta_c$% of about 0.34%. Each core member had a diameter dc of 8.4 microns and was single-moded at a wavelength of 1550 nm. However, in this example, the first optical fiber ribbon had a length of 100 meters while the second optical fiber ribbon had a length of 2 meters. Curve 406 shows the cross-talk as a function of the center-to-center spacing of adjacent core members for the 2 meter ribbon while curve 408 shows the cross talk as function of the center-to-center spacing of adjacent core members for the 100 meter ribbon. As shown in FIG. 13, the 2 meter ribbon generally had a cross-talk which was about 3 dB less than the cross-talk of the 100 m ribbon.

Example 3

Figure 14:
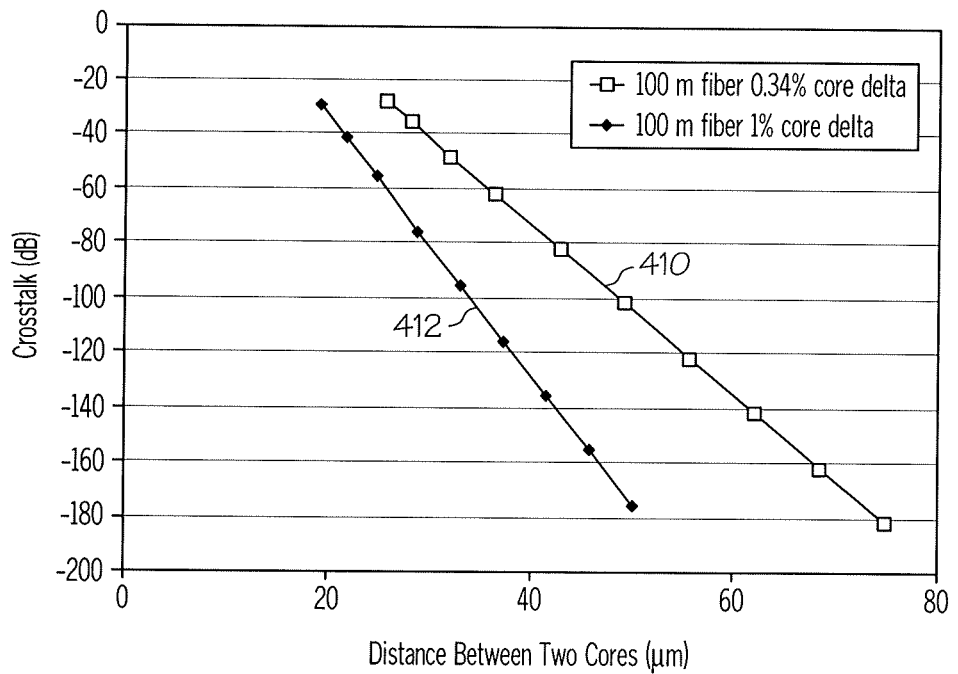
FIG. 14 graphically depicts a plot of the of the cross-talk between two adjacent core members as a function of the center-to-center spacing between the two adjacent core members for i) a pair of core members with a core relative refractive index $\Delta_c\% = 0.34\%$ and ii) a pair of core members with a core relative refractive index $\Delta_c\% = 1.0\%$.

Referring to FIG. 14, a pair of multi-core optical fiber ribbons were mathematically modeled. Each core member of the first optical fiber was modeled with a step refractive index profile and a core relative refractive index $\Delta_c$ % of about 0.34%. Each core member had a diameter $d_c$ of 8.4 microns and was single-moded at a wavelength of 1550 nm. Each core member of the second optical fiber was modeled with a step refractive index profile and a core relative refractive index $\Delta_c$ % of about 1.0%. Each core member had a diameter $d_c$ of 4.9 microns and was single-moded at a wavelength of 1550 nm. Curve 410 shows the cross-talk as a function of the center-to-center spacing of adjacent core members for the first multi-core ribbon while curve 412 shows the cross talk as function of the center-to-center spacing of the second multi-core ribbon. As shown in FIG. 13, increasing the relative refractive index $\Delta_c$ % of the core members and decreasing the core diameter reduces the cross-talk between the core members as the power of each core member is more confined to that core member which, in turn, reduces the coupling coefficient between the adjacent core members.

Example 4

Figure 15:
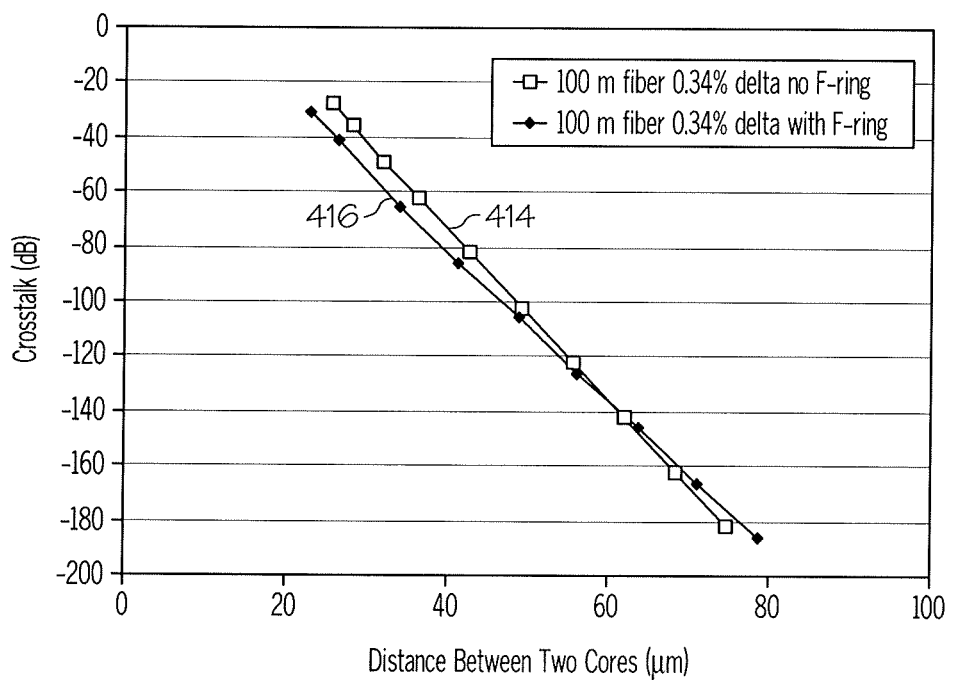
FIG. 15 graphically depicts a plot of the of the cross-talk between two adjacent core members as a function of the center-to-center spacing between the two adjacent core members for i) a pair of core members formed without a low-index ring and ii) a pair of core members formed with a low-index ring.

Referring to FIG. 15, a pair of multi-core optical fiber ribbons were mathematically modeled. Each core member of both optical fiber ribbons was modeled with a step refractive index profile and a core relative refractive index $\Delta_c$ % of about 0.34%. Each core member had a diameter $d_c$ of 8.4 microns and was single-moded at a wavelength of 1550 nm. However, in this example, the core members of the second fiber ribbon were formed with a low-index ring as the outermost portion of each core member. The low-index ring had a relative refractive index $\Delta_1$% of −0.4% and a radial thickness of 4 microns. Curve 414 shows the cross-talk as a function of the center-to-center spacing of adjacent core members for the ribbon without the low-index rings and curve 416 shows the cross talk as function of the center-to-center spacing of adjacent core members for the ribbon formed with the low index rings. As demonstrated in FIG. 15, the fiber ribbon with the low index rings can achieve a −35 db cross-talk with a smaller center-to-center spacing than the ribbon formed without the low index rings.

Example 5

In this example, a multi-mode optical fiber ribbon was modeled. Each core member had a relative refractive index $\Delta_c$ % of 1.0% and a diameter $d_c$ of 50 microns. Each core member supported 18 mode groups at 850 nm. In order for the fiber to achieve a cross-talk of −35 dB at an operating wavelength of 850 nm under overfilled launch conditions, it was determined that the center-to-center spacing between adjacent cores should be at least 66 microns.

Example 6

In this example, a multi-mode optical fiber ribbon was modeled. Each core member had a relative refractive index $\Delta_c$ % of 2.0% and a diameter $d_c$ of 25 microns. Each core member supported 13 mode groups at 850 nm. In order for the fiber to achieve a cross-talk of −35 dB at an operating wavelength of 850 nm under overfilled launch conditions, it was determined that the center-to-center spacing between adjacent cores should be at least 41 microns.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A multi-core optical fiber ribbon comprising:
    a single row of at least four core members formed from silica-based glass and oriented in parallel with one another in a single plane, wherein the at least four core members comprise silica glass up-doped with from about 4.0 wt. % to about 40 wt. % $GeO_2$ and adjacent core members of the at least four core members have a center-to-center spacing ≥15 microns, a cross-talk between adjacent core members is ≤−25 dB, and the at least four core members are single-moded with an index of refraction $n_c$, and a core diameter $d_c$; and
    a single cladding layer formed from silica-based glass surrounding and in direct contact with the at least four core members, wherein the single cladding layer is substantially rectangular in cross section with a thickness ≤400 microns and an index of refraction $n_{c1} < n_c$ and the at least four core members have a relative refractive index $\Delta_c$% from about 0.2% to about 2.0% relative to the single cladding layer and a delta variation between adjacent core members is ≥1%.

2. The multi-core optical fiber ribbon of claim 1, wherein the at least four core members are equidistantly spaced.

3. The multi-core optical fiber ribbon of claim 1, wherein the core diameter $d_c$ is ≤15 microns.

4. The multi-core optical fiber ribbon of claim 1, wherein the thickness of the single cladding layer is ≤125 microns.

5. The multi-core optical fiber ribbon of claim 1, wherein an effective index variation between adjacent core members is ≥5×10$^{-5}$.

6. The multi-core optical fiber ribbon of claim 1, wherein a ratio R of the center-to-center spacing between adjacent cores members to the core diameter $d_c$ of the at least four core members is such that 2≤R≤6.

7. The multi-core optical fiber ribbon of claim 1, wherein the at least four core members each comprise a low-index ring formed from silica-based glass, the low-index ring having an index of refraction $n_1$, wherein $n_1 \leq n_{c1} \leq n_c$.

8. The multi-core optical fiber ribbon of claim 1, further comprising an optical coating layer surrounding and indirect contact with the single cladding layer, wherein the optical coating layer has an index of refraction $n_{ct} \geq n_{c1}$.

9. The multi-core optical fiber ribbon of claim 1, wherein a length of the multi-core optical fiber ribbon is less than 100 meters.

10. A multi-core optical fiber ribbon comprising:
at least four core members formed from silica-based glass and oriented in parallel with one another in a single plane, wherein the at least four core members comprise silica glass up-doped with from about 4.0 wt. % to about 40 wt. % GeO$_2$ and adjacent core members have a center-to-center spacing ≥35 microns, a cross-talk between adjacent core members is ≤−25 dB, and the at least four core members are multi-moded with a core index of refraction $n_c$, a core diameter $d_c$ of greater than 15 microns, an alpha profile with an α value from about 1.9 to about 2.1, and a bandwidth >300 MHz; and
a single cladding layer formed from silica-based glass surrounding and in direct contact with the at least four core members, wherein the single cladding layer is substantially rectangular in cross section with a thickness ≤400 microns and a cladding index of refraction $n_{c1} < n_c$ and the at least four core members have a relative refractive index $\Delta_c\%$ from about 0.2% to about 2.0% relative to the single cladding layer and a delta variation between adjacent core members is ≥1%.

11. The multi-core optical fiber ribbon of claim 10, wherein the at least four core members are equidistantly spaced.

12. The multi-core optical fiber ribbon of claim 10, wherein the thickness of the single cladding layer is ≤125 microns.

13. The multi-core optical fiber ribbon of claim 10, wherein a ratio R of the center-to-center spacing of adjacent cores members to the core diameter $d_c$ of the at least four core members is such that 1≤R≤3.

14. The multi-core optical fiber ribbon of claim 10, further comprising an optical coating layer surrounding and in direct contact with the single cladding layer, wherein the optical coating layer has a refractive index $n_{ct} \geq n_{c1}$.

15. The multi-core optical fiber ribbon of claim 10, wherein a length of the multi-core optical fiber ribbon is less than 100 meters.

* * * * *